(12) United States Patent
Lauzat et al.

(10) Patent No.: US 10,612,424 B2
(45) Date of Patent: Apr. 7, 2020

(54) METHOD AND DEVICE FOR CONTROLLING THE SPRAYING OF WATER INTO THE FLUE GAS DUCT OF A GAS AND STEAM TURBINE INSTALLATION

(71) Applicant: Siemens Aktiengesellschaft, Munich (DE)

(72) Inventors: Thorsten Lauzat, Essen (DE); Denis Tschetschik, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 369 days.

(21) Appl. No.: 14/898,133

(22) PCT Filed: Jun. 4, 2014

(86) PCT No.: PCT/EP2014/061536
§ 371 (c)(1),
(2) Date: Dec. 13, 2015

(87) PCT Pub. No.: WO2014/202384
PCT Pub. Date: Dec. 24, 2014

(65) Prior Publication Data
US 2016/0146059 A1 May 26, 2016

(30) Foreign Application Priority Data
Jun. 18, 2013 (DE) .................. 10 2013 211 376

(51) Int. Cl.
*F01K 23/10* (2006.01)
*F02C 6/18* (2006.01)
(Continued)

(52) U.S. Cl.
CPC ............ *F01K 23/10* (2013.01); *F01D 25/305* (2013.01); *F02C 6/18* (2013.01); *F22B 1/1815* (2013.01);
(Continued)

(58) Field of Classification Search
CPC ......... F01D 25/305; F22B 35/007; F02C 3/30
See application file for complete search history.

(56) References Cited

U.S. PATENT DOCUMENTS 3,799,249 A   3/1974 Linhardt
5,404,708 A * 4/1995 Sigling ................. F01K 23/108
                                                  60/39.182
(Continued)

FOREIGN PATENT DOCUMENTS

EP    0579061 A1   1/1994
EP    1462633 A1   9/2004
(Continued)

OTHER PUBLICATIONS

JP Office Action dated Jan. 4, 2017, for JP patent application No. 2016-520358.

*Primary Examiner* — Todd E Manahan
*Assistant Examiner* — Katheryn A Malatek
(74) *Attorney, Agent, or Firm* — Beusse Wolter Sanks & Maire

(57) ABSTRACT

A method for operating a gas and steam turbine installation, wherein the heat contained in the expanded flue gas of the gas turbine is used to generate steam for the steam turbine. If a critical operating state arises, the temperature of the expanded flue gas is reduced by introducing water into the expanded flue gas in the flue gas duct between the gas turbine and the waste-heat steam generator connected downstream with regard to flow, wherein the amount of water to be introduced is determined in dependence on the flue gas temperature. The flue gas temperature is measured before water is introduced into the flue gas, an average combustion temperature of the combustion chamber of the gas turbine is determined from the flue gas temperature, and the amount of water to be introduced is set on the basis of the combustion temperature.

14 Claims, 1 Drawing Sheet

(51) Int. Cl.
*F22B 35/00* (2006.01)
*F22B 1/18* (2006.01)
*F01D 25/30* (2006.01)

(52) U.S. Cl.
CPC ........ *F22B 35/007* (2013.01); *F05D 2220/31* (2013.01); *F05D 2220/32* (2013.01); *F05D 2240/35* (2013.01); *Y02E 20/16* (2013.01); *Y02P 80/154* (2015.11)

(56) References Cited

U.S. PATENT DOCUMENTS

| | | | |
|---|---|---|---|
| 7,124,591 B2 * | 10/2006 | Baer | F02C 7/12 60/782 |
| 2004/0055273 A1 * | 3/2004 | Hirayama | F02C 9/28 60/39.281 |
| 2009/0205310 A1 | 8/2009 | Hibshman, II et al. | |
| 2012/0186261 A1 | 7/2012 | Toprani et al. | |
| 2012/0260667 A1 | 10/2012 | Chillar et al. | |
| 2014/0150438 A1 * | 6/2014 | Ellis | F02C 9/26 60/772 |

FOREIGN PATENT DOCUMENTS

| | | | |
|---|---|---|---|
| EP | 1442203 | B1 | 5/2006 |
| JP | 2003120418 | A | 4/2003 |
| JP | 2009197800 | A | 9/2009 |
| JP | 2011144742 | A | 7/2011 |
| JP | 2012149640 | A | 8/2012 |
| JP | 2013040567 | A | 2/2013 |

* cited by examiner

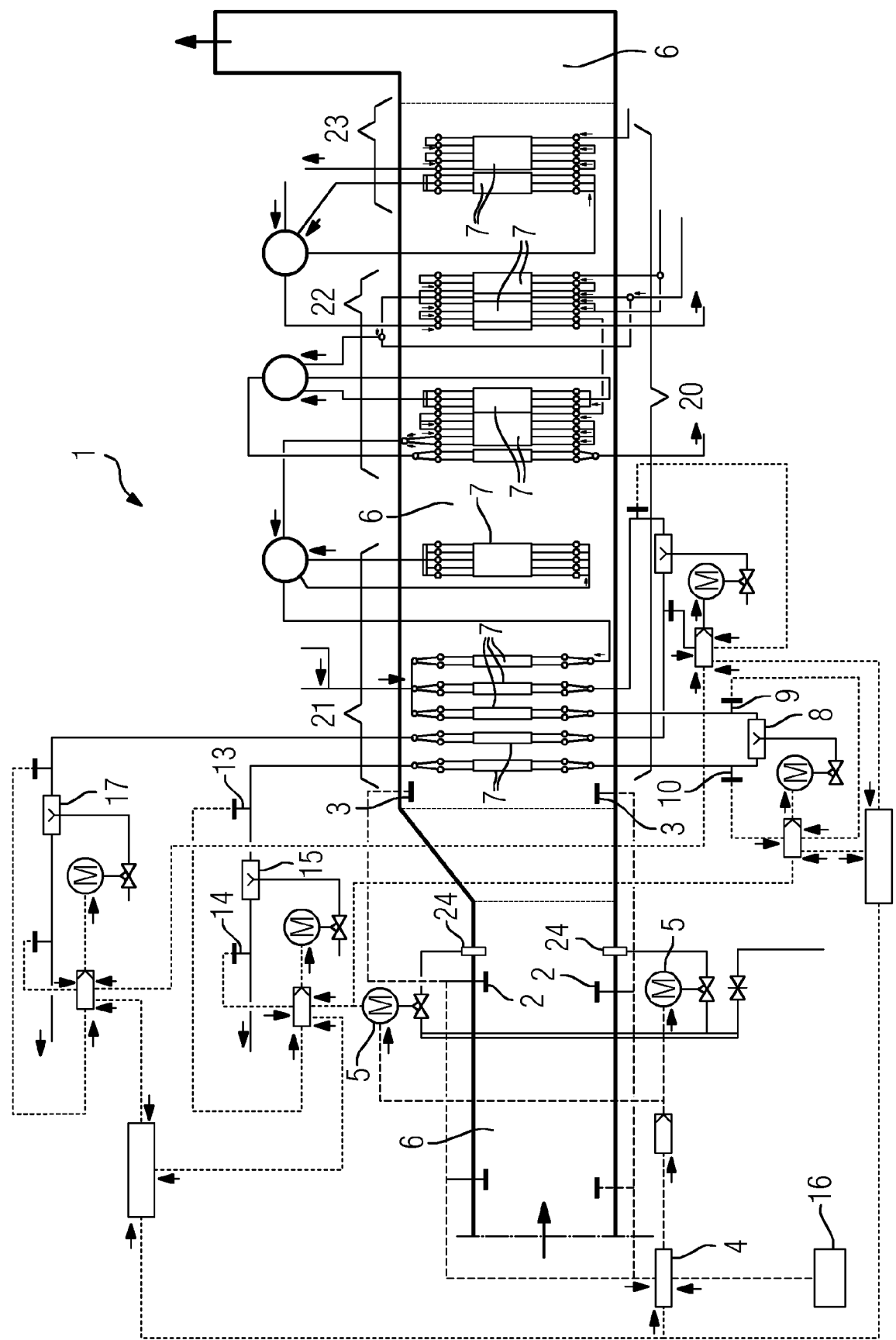

METHOD AND DEVICE FOR CONTROLLING THE SPRAYING OF WATER INTO THE FLUE GAS DUCT OF A GAS AND STEAM TURBINE INSTALLATION

CROSS REFERENCE TO RELATED APPLICATIONS

This application is the US National Stage of International Application No. PCT/EP2014/061536 filed Jun. 4, 2014, and claims the benefit thereof. The International Application claims the benefit of German Application No. DE 102013211376.5 filed Jun. 18, 2013. All of the applications are incorporated by reference herein in their entirety.

FIELD OF INVENTION

The invention relates to a method for controlling exhaust gas and steam temperatures by means of the spraying of water into the flue gas duct of a gas and steam turbine installation (CCPP), in which the heat contained in the expanded flue gas (exhaust gas) of the gas turbine is used to generate steam for the steam turbine. It is also directed to a gas and steam turbine installation operated by this method.

BACKGROUND OF INVENTION

In a gas and steam turbine installation, the heat contained in the expanded flue gas of the gas turbine is used to generate steam for the steam turbine. Heat transfer takes place in a waste-heat steam generator (WHSG), which is connected downstream of the gas turbine and in which heating surfaces in the form of heating tubes or tubes are arranged in tube bundles and connected to the water-steam circuit of the steam turbine.

The waste-heat steam generator and the steam turbine form the steam component of the gas and steam turbine installation. In general, the gas turbine is designed in such a way that the exhaust gas parameters thereof (temperature, mass flow, excess pressure) match the inlet parameters of the downstream systems within wide operating ranges.

During the operation of an installation of this kind, however, the heat introduced into the steam generator differs in different operating states. In this case, critical operating states often occur owing to the different dynamic behavior of the installation components. These arise from the relatively large delay or response times and different sensitivities of the steam turbine installation compared to the gas turbine installation. Thus, in start-up or load-change mode, for example, especially in the case of "quick starts" or rapid load changes, large temperature gradients and/or changes in temperature with respect to time and significant changes in the mass flow of the expanded flue gas occur. In start-up and load-change mode, the gas turbine installation is therefore generally restricted in terms of temperature and power.

A temperature measuring device and control system for the hot gas temperature of a gas turbine is described in EP 1 462 633. EP 1 442 203 B1 describes a method for controlling the cooling air mass flows of a gas turbine group. However, the problem of the occurrence of large temperature gradients in the case of quick starts or rapid load changes is not countered in this document.

In order to counteract this problem, the gas turbine and the steam component can be decoupled by means of a bypass stack connected between the gas turbine and the waste-heat steam generator. In the event of a case of operation which represents a critical state for the steam generator, the expanded flue gas can thus be discharged via the bypass stack ahead of the steam generator. For a gas and steam turbine installation, this involves a reduction in power and reduced efficiency.

If there is no bypass stack, the gas turbine and the waste-heat generator cannot be decoupled from one another. In the case of a gas and steam turbine installation without a bypass stack, a critical operating state occurs especially if the installation is operated in the part-load range, particularly at high ambient temperatures. Since there is no bypass stack, the steam generator is unavoidably operated at the same time. To ensure that the temperature in the steam generator remains below the permitted design limit for the steam lines, the steam turbine and/or the bypass station, the steam produced in the steam generator must be cooled. Consequently, the management system of the power plant must ensure that an impermissible increase in the temperature of the material of the heat exchanger tubes and headers due to impermissibly high temperatures at the heating surfaces is avoided in the case of the unavoidably falling steam production in the steam generator. This requires the artificial lowering of the flue gas temperature of the gas turbine. Such a mode of operation is associated with losses in the efficiency of the overall installation since the heat energy in the flue gas is reduced and thus remains partially unused.

Owing to the close coupling and dependence between the gas turbine and the steam component, this unavoidable operation has generally negative effects on the flexibility of the installation since the steam component responds to the waste heat provided by the gas turbine only with a significant delay and in a very complex manner.

To counter this problem, European Patent EP 0 579 061 A1 describes a device and a method for operating a gas and steam turbine installation which allows as gentle as possible operation with, at the same time, a high overall efficiency in all operating states, that is to say also in the case of critical states in the start-up or load-change mode. For this purpose, it discloses a method in which, when a critical operating state of the gas and steam turbine installation is reached, the temperature of the expanded flue gas is reduced by introducing water into the expanded flue gas. In this process, water is sprayed into the flue gas duct by means of a spraying device. The amount of water to be introduced is determined in dependence on the flue gas temperature. For this purpose, an actuator, a control element and two temperature sensors are provided in the flue gas duct. The temperature sensors are arranged after the injection device in the flue gas duct. The temperature sensors thus detect the temperature of the flue gas which has already been cooled by injected water. The control element compares the measured actual temperature with a predetermined setpoint temperature and adjusts the amount of water to be introduced if there is a difference between the setpoint and the actual temperature.

The disadvantage of the prior art is, in particular, the fact that the measurement results are falsified by the spraying in of water ahead of the measuring points, which leads to incorrect determination of the combustion temperature in the gas turbine and thus to a highly negative intervention in the control thereof in the case of steady-state operating modes but especially also in the case of non-steady operating modes of the gas turbine. The highly distorted measured values occur because major fluctuations in temperature distribution are caused by the water sprayed in.

SUMMARY OF INVENTION

It is an object of the invention to indicate a method and a device by means of which both trouble-free operation and the flexibility of a gas and steam turbine installation without a bypass stack can be increased as compared with the prior art in such a way that improved availability of the installation with, at the same time, gentle operation of the gas and steam turbine installation is achieved.

This object, as it pertains to a method, is achieved by a method for operating a gas and steam turbine installation in which the heat contained in the expanded flue gas of the gas turbine is used to generate steam for the steam turbine by a procedure in which, when a critical operating state occurs, the temperature of the expanded flue gas is reduced by introducing water into the expanded flue gas in the flue gas duct between the gas turbine and the waste-heat steam generator connected downstream with regard to flow. According to the invention, at least a first flue gas temperature of the flue gas is measured ahead of the introduction of water into the flue gas, and an average combustion temperature of the gas turbine is determined from this measured flue gas temperature, and the amount of water to be injected is set on the basis of a control function based on the average combustion temperature.

The invention makes use of the insight from the prior art and achieves a reduction in the flue gas temperature by spraying water into the flue gas duct between the gas turbine and the steam generator. In contrast to the prior art, however, the amount of water to be introduced is determined not only in dependence on a flue gas temperature measured after the water nozzles but in dependence on a complex control function derived from the average combustion temperature of the gas turbine.

As the manipulated variable for control, use is made of the water mass flow which is sprayed into the flue gas duct of the gas turbine. By means of this manipulated variable, it is possible to adjust the controlled variable very quickly and effectively. When this manipulated variable is incorporated into the unit control level, the gas turbine and the steam turbine are thermally decoupled to a large extent (possibly virtually over the entire operating range). This has the effect that currently existing control and operating restrictions will no longer be applicable and are eliminated, and the availability of the installation is not put at risk.

A number of problems that remained unsolved by the previous method are solved by the measurement of the flue gas temperature, which is now significantly more accurate and is not affected by the spraying in of water, and by what is therefore a very accurate determinability of the average combustion temperature and the control-system linking of the injected water system for exhaust gas into the control circuits of the steam temperature control system:

By means of the invention, it is thus possible in existing installations to eliminate the problem that, if parameters of the gas turbine are modified by the installation of upgrades, the steam component often no longer operates in the optimum operating range or even the permissible and stable operation of the individual components of the water-steam circuit can no longer be guaranteed.

By means of the invention, it is also possible to reduce emissions. Thus, hitherto, it was necessary, in the case of operating modes involving low part loads, to reduce the exhaust gas temperature of the gas turbine to such an extent that the loading limits of the steam generator were not exceeded. This led to increased CO emissions from the gas turbine. To ensure that the CO emissions of the gas turbine did not become too high and that the respective limit of the installation was not exceeded, the minimum power of the gas turbine was raised when the CO limit was reached, even though there was the potential to operate the gas turbine at even lower loads. This state has a severe negative effect on the flexibility of the installation.

By virtue of the controlled intervention, according to the invention, involving the spraying in of water by means of a very precisely defined controlled variable as a function of the average combustion temperature, it is not necessary to lower the exhaust gas temperature of the gas turbine at low part loads in order to protect the steam generator. If the exhaust gas temperature remains constant, or if it is indeed possible to increase it, the CO emissions also remain within the prescribed limits. The advantage of this mode of operation would be not only a reduction in CO emissions but also the possibility of operating the installation in a stable and optimum manner with a relatively high efficiency at very low part loads and thus the ability to respond flexibly and reliably and to make considerable fuel savings.

During the starting process of the installation (especially in the case of a cold start), the gas turbine had to heat up the steam generator slowly and wait for the availability of the water-steam circuit. In addition, the gas turbine runs up to part load relatively slowly (about 1 hour or longer). During this time, the gas turbine not only produces relatively high emissions with a very low power but also sacrifices a great deal of its power, effectiveness and flexibility. Moreover, a comparatively larger amount of fuel is required, and this cannot be converted into electric power very effectively.

If water is introduced under control in accordance with the invention during the starting process, the boiler inlet temperature can thereby be set in such a way that the gas turbine can run up to full load even though the steam generator and the water-steam circuit have not yet been preheated and thus cannot yet be operated. The control of the inlet temperature of the steam generator by spraying in water in accordance with the invention is able to ensure that the steam generator is preheated slowly (i.e. in accordance with the operating parameters) and can absorb power gradually. The advantage from control according to the invention lies not only in a considerable time saving during the full starting of the gas turbine but also in a considerable fuel saving as well as in a significant reduction in emissions, especially CO. A further application of the control system would be when the gas turbine is supposed to operate for only a short time, in order to cover peak loads for example. In this case, the steam component would simply be decoupled from the gas turbine. Thus, by means of control according to the invention, the overall flexibility of the installation is considerably extended.

At high ambient temperatures, the limits of the steam generator were hitherto often reached or exceeded both at full and at part loads. To allow operation of the installation at high ambient temperatures, it was hitherto necessary in extreme cases to lower the exhaust gas temperature of the gas turbine, which leads to a loss of power and efficiency. According to the invention, it is now possible, by means of precise control of water spraying at high ambient temperatures, to match the exhaust gas temperature of the gas turbine and other parameters (e.g. steam temperatures) to the boiler and steam turbine limits. The gas turbine can thus continue to be operated in its optimum range and there is no loss of power and efficiency.

When upgrades were installed in the gas turbine with a view to an increased gas turbine firing temperature, the limits of the steam generator were previously often reached and exceeded in wide ranges. Incorporation of the spraying in of water in a manner controlled in accordance with the invention makes it possible to install upgrades and refinements in gas turbines with a view to an increased firing temperature since the limits of the steam generator now no longer represent a restriction.

Control of the gas turbine and the steam generator were previously very much dependent one upon the other and could not be carried out separately without a bypass stack. By virtue of the precise control of the spraying in of water in accordance with the invention and integration of this control into the block line, the gas turbine and the steam component are decoupled from one another in very wide operating ranges. As a result, the entire installation can be operated in a flexible and more optimized manner. The respective advantages of the gas turbine and the steam turbine can be exploited almost to the full.

The temperature sensors in the flue gas duct are measuring points which are required in any case to determine the combustion temperature in the gas turbine. The first measuring point is used to measure the flue gas temperature at the inlet of the flue gas duct. This is located after the outlet of the gas turbine. Precisely in non-steady operation of the gas turbine, there are large uncertainties in measurement at the first measuring point owing to fluctuations in the flue gas flow. For this reason, the temperature is additionally measured by the second measuring point at the end of the flue gas duct, where the fluctuations in the flow of the flue gas are smaller. In the case of non-steady states, the first measured value is corrected by the second measured value.

The spraying in of water in accordance with the invention advantageously takes place after the temperature measuring points. If the gas turbine control permits, however, it can also be advantageous if the spraying in of water takes place between the first and the second temperature measuring point. This has the advantage that the gas turbine diffuser, the maximum design temperature of which is generally from 600° C. to 630° C., is likewise cooled. Additional complex control corrections are therefore not required.

The nozzles should be built into the flue gas duct in such a way that they spray from the circumference of the exhaust gas diffuser into the center of the exhaust gas diffuser. The nozzles are supplied with deionized water or similar, being connected directly to the water system of the steam component (steam circuit, e.g. condensate). The water nozzles are installed in the flue gas duct in such a way that the exhaust gas field into the first heating surface remains as uniform as possible in respect of temperature and speed.

In a special development, water injection into the steam-carrying steam tubes of the water-steam circuit, in particular of the steam generator, is introduced in addition to the connection, in terms of control, of water injection to the gas turbine exhaust gas in order to further increase the availability and flexibility of the gas and steam turbine installation.

The water injections into the steam-carrying steam tubes of the steam generator are already known as an isolated measure for controlling the steam temperature. In interaction with the control according to the invention, however, it is thereby possible to increase the availability and flexibility of the gas and steam power installation considerably as compared with the known method of steam temperature control. Moreover, the possibilities of development of individual components of the CCPP (especially that of the gas turbine) can be increased. By control according to the invention, water injection into the water-steam circuit is relieved, optimized and, in interaction with all the injections (water spraying in the exhaust gas and water injection in the water-steam circuit), is better matched to the mode of operation of the installation. As a result, the operator obtains more control options for quickly and effectively implementing the desired parameters in the water-steam circuit with the aid of the existing management system, even in the case of complex physical processes (e.g. starting, load changes). Control of water injection into the gas turbine exhaust gas in accordance with the invention and the water injections into the steam-carrying steam tubes of the water-steam circuit are interlinked and incorporated into the management system of the overall installation.

In order to determine the amount of water to be introduced into the flue gas duct in this enhanced version, the steam temperatures before and after the corresponding water injection coolers into the water-steam circuit and the live steam temperatures to the component steam turbines are taken into account in the control function in addition to the average combustion temperature of the gas turbine. Moreover, it is also possible to take account in the control function of other requirements on the load transients of the gas or steam turbine, starting requirements of the various components of the circuit or specific requirements of the frequency control of the block and interventions of the operator. At the same time, the accuracy and independence of calculation of the combustion temperature in the gas turbine continues to be assured.

The described development of the invention essentially offers the advantage over the prior art that there is a control link between the spraying of water into the steam generator tubes and the injection cooling in the water-steam circuit. Without such a link of the two systems, operation of the installation is highly complex, very susceptible to malfunctions and very probably impossible without malfunctions. This is due especially to the fact that each system has a limited area of application for temperature control, which quickly reaches its limits when controlled separately. Only combination and matching of the two systems creates a significant expansion of the area of application and of the control capacity of the overall installation. Linking the systems significantly expands the individual limits or sets them so high that they are no longer even reached by the operation of the installation. Malfunctions and damage in this area are significantly minimized, and the dynamics of the installation are significantly enhanced.

The object of the invention as it pertains to a device is achieved by a gas and steam turbine installation having a steam generator, connected downstream of the gas turbine by way of a flue gas duct, for generating steam in a water-steam circuit of the steam turbine, having nozzles for introducing water into the flue gas duct, wherein the nozzles are arranged after at least one first temperature measuring point for determining the combustion temperature in the direction of flow of the flue gas.

The advantages of the device according to the invention will become apparent by way of analogy from the method according to the invention.

BRIEF DESCRIPTION OF THE DRAWINGS

The invention is explained in greater detail below by means of a FIGURE.

DETAILED DESCRIPTION OF INVENTION

The FIGURE shows a gas and steam turbine installation 1 having water spraying, controlled in accordance with the invention, into the flue gas duct and water injection into the water-steam circuit and having the development involving water injection into the tubes of the steam generator.

The FIGURE shows a flue gas duct 6, through which a flue gas can flow from the left to the right. The gas turbine connected ahead of the flue gas duct 6 with regard to flow is not shown here.

The flue gas duct 6 surrounds a steam generator 20, with a number of pressure stages 21, 22, 23, which, in turn, each have a number of heating surfaces 7. A first temperature sensor 2, a nozzle arrangement 24 and a second temperature sensor 3 are arranged in such a way in the flue gas duct 6, in the direction of flow, that the first temperature sensor is positioned ahead of the nozzle arrangement 24 and the second temperature sensor is arranged after the nozzle arrangement.

According to the invention, the water injection into the flue gas duct 6 by the nozzle arrangement 24 is controlled primarily by a control function, which is stored as a control algorithm in a control cabinet 4. To implement the control signal, a number of control elements 5 in the form of valves are provided. The nozzle arrangement 24 comprises a number of nozzles, which are each controlled by means of a dedicated, associated control element 5.

The control algorithm is defined using an established analysis both of an external parameter 16 and of internal signals.

The internal signals include the temperatures of the first temperature sensor 2 and the second temperature sensor 3, as well as signals from the control outputs of the pressure stages 21, 22, 23 (in particular the high-pressure stage, the reheater and the final and intermediate injection coolers).

Control of the gas turbine is not affected by the use of the temperature signals 2 and 3 in the control and by arrangement of the spraying of water in the flue gas duct 6 after the temperature measuring point 2.

The FIGURE furthermore shows features of an embodiment of the invention with additional injection of water into the tubes of the steam generator. Water is injected into the steam tubes of pressure stage 21. Water injection ahead of high-pressure part 8, water injection after high-pressure part 12, water injection ahead of reheater 15 and water injection after reheater 17 are provided.

Each of the water injection devices 8, 12, 15 and 17 is controlled by means of a respective actuator, each actuator having an associated control element. The control elements each receive signals, which are influenced by the control cabinet 4. For this purpose, all the control elements are connected to the control cabinet 4.

Each of the control elements for controlling the respective actuators furthermore has a temperature sensor ahead of the respective injection point and a temperature sensor after the respective injection point.

Thus, for example, the water injection ahead of high-pressure part 8 has a temperature sensor 9 ahead of water injection 8 and a temperature sensor 10 after water injection 8. The water injection after high-pressure part 12 has a temperature sensor 13 ahead of water injection 12 and a temperature sensor 14 after water injection 12.

The number, design and arrangement of the water nozzles in the flue gas duct 6 and the minimum and maximum amount, temperature and pressure of the water injected are selected in such a way that the flue gas is as uniform as possible at the first heating surface of the first pressure stage 21 in terms of temperature, speed and concentration.

The invention claimed is:

1. A method for operating a gas and steam turbine installation comprising a gas turbine that provides heat via an expanded flue gas in a flue gas duct to a waste heat steam generator (WHSG), in which the heat contained in the expanded flue gas of the gas turbine is used to generate steam in steam carrying tubes of the WHSG that form a part of a water-steam circuit of a steam turbine, the method comprising:
   reducing a temperature of the expanded flue gas to avoid a critical operating state by:
      measuring, with a first temperature sensor, a first temperature value of the temperature of the expanded flue gas at a first measuring point ahead of the introduction of the water into the expanded flue gas with regard to flow,
      measuring, with a second temperature sensor, a second temperature value of the temperature of the expanded flue gas at a second measuring point in the flue gas downstream of the first measuring point,
      correcting the first temperature value from the first measuring point with the second temperature value from the second measuring point,
      determining an average combustion temperature of the gas turbine from the corrected first temperature value of the temperature of the expanded flue gas,
      setting an amount of water to be introduced into the expanded flue gas in the flue gas duct between the gas turbine and the WHSG on the basis of the average combustion temperature, and
   thermally decoupling the gas turbine from the steam turbine during a load-change process of the gas and steam turbine installation by setting an inlet temperature of the WHSG, and maintaining the WHSG inlet temperature by said introducing of the water into the expanded flue gas, operating the gas turbine within an operating range thereof during the load-change process without restriction by an operating range of the WHSG and the steam turbine, and operating the WHSG and the steam turbine within the operating range thereof during the load-change process without restriction by the operating range of the gas turbine.

2. The method as claimed in claim 1,
   wherein the average combustion temperature is set on the basis of a function derived from the corrected first temperature value of the temperature of the expanded flue gas in the flue gas duct, from a steam temperature in a pressure stage of the WHSG, from load transients of the gas turbine and steam turbine and from limits for the steam turbine.

3. The method as claimed in claim 1, further comprising:
   further thermally decoupling the gas turbine from the steam turbine by injecting, with water injection devices, further water into the steam-carrying tubes of the water-steam circuit to maintain the operating range of the WHSG and the steam turbine by cooling the steam, and interlinking a control of the injection of the further water into the steam-carrying tubes with a control of the introduction of water into the flue gas duct to effect the further thermal decoupling over a range of operating conditions.

4. A gas and steam turbine installation, comprising:
   a flue gas duct;
   a waste heat steam generator (WHSG);
   a gas turbine that provides heat via an expanded flue gas in the flue gas duct to the WHSG,
   a nozzle arrangement for the introducing a water into the flue gas duct;
   a first temperature sensor configured to measure a first temperature value of a temperature of the expanded flue gas at a first measuring point in the flue gas duct ahead of the introducing of the water into the flue gas duct;

a second temperature sensor configured to measure a second temperature value of the temperature of the expanded flue gas at a second measuring point in the flue gas duct downstream of the first measuring point; and a control element configured to receive signals from the first temperature sensor and the second temperature sensor indicating the first temperature value and the second temperature value and further configured to correct the first temperature value with the second temperature value;

and wherein the control element further determines an average combustion temperature of the gas turbine from the corrected first temperature value and sets an amount of the water to be introduced through the nozzle arrangement on the basis of the average combustion temperature.

5. The gas and steam turbine installation as claimed in claim 4, wherein the nozzle arrangement is configured to spray the water introduced into the flue gas duct.

6. The method as claimed in claim 1, wherein the load-change process comprises a start-up process comprising:

running-up the gas turbine to a full load before the WHSG and the water-steam circuit have been preheated, and thus cannot yet be operated; and during said running-up, heating the WHSG and the water-steam circuit more gradually than the gas turbine, using the heat of the expanded flue gas.

7. The method as claimed in claim 1, wherein the first measuring point is at an inlet of the flue gas duct.

8. The method as claimed in claim 1, wherein the decoupling is performed without using a flue bypass to discharge the expanded flue gas from the flue gas duct before it reaches the WHSG.

9. The method as claimed in claim 1, wherein the first measuring point and the second measuring point are both ahead of the introduction of the water into the expanded flue gas with regard to flow.

10. The method as claimed in claim 1, wherein the second measuring point is after the introduction of the water into the expanded flue gas with regard to flow.

11. The method as claimed in claim 1, wherein a fluctuation in the first temperature value of the expanded flue gas at the first measuring point is greater than a fluctuation in the second temperature value of the expanded flue gas at the second measuring point.

12. The method as claimed in claim 3, further comprising measuring a temperature of the steam in the steam-carrying tubes.

13. The method as claimed in claim 12, wherein the measuring comprises:

measuring, with a third temperature sensor, a third temperature value of the temperature of the steam in the steam-carrying tubes at a third measuring point ahead of the injection of the further water into the steam-carrying tubes; and measuring, with a fourth temperature sensor, a fourth temperature value of the temperature of the steam in the steam-carrying tubes at a fourth measuring point after the injection of the further water into the steam-carrying tubes; and controlling, with an actuator, the water injection device, based on the third temperature value and the fourth temperature value.

14. The gas and steam turbine installation of claim 4, wherein the flue gas duct surrounds the steam generator.

* * * * *